May 1, 1928.
J. S. KENNEDY
1,668,319
AUTOMATIC CONTROLLER FOR GAS MAKING APPARATUS
Filed Oct. 30. 1924        11 Sheets-Sheet 4
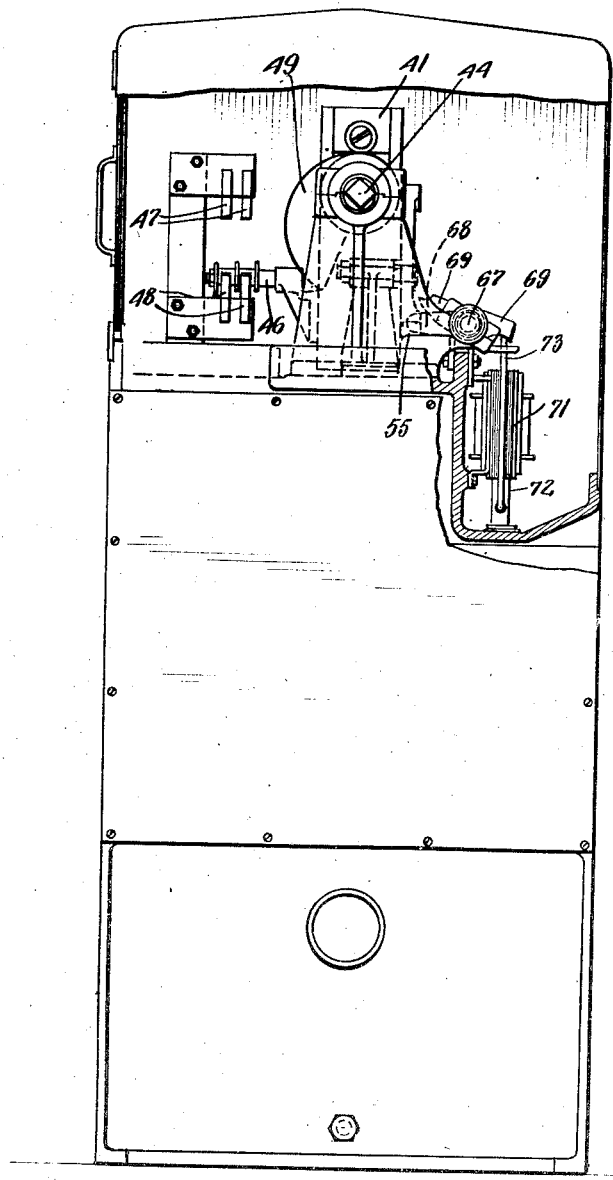
INVENTOR
James S. Kennedy
BY
ATTORNEY

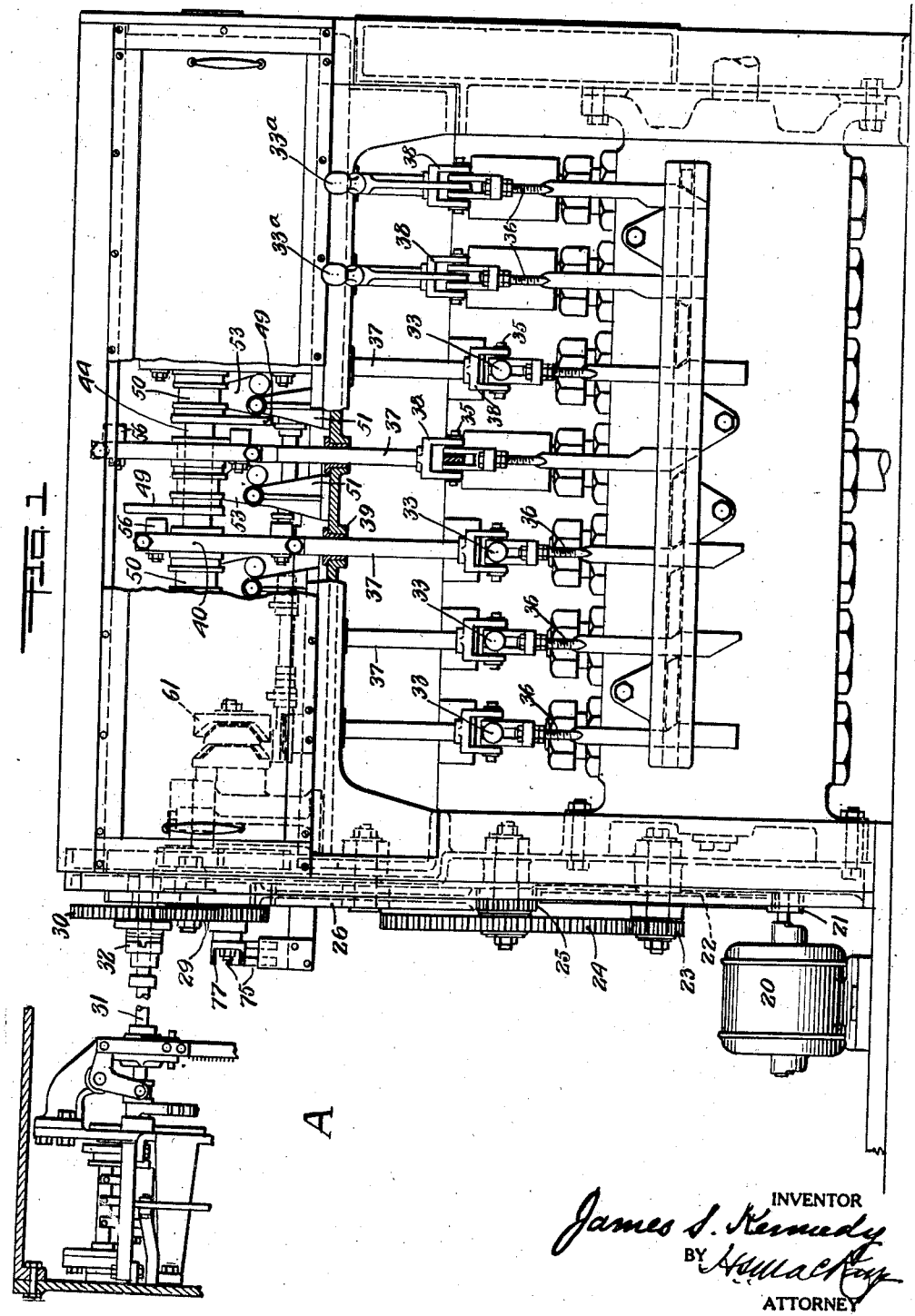

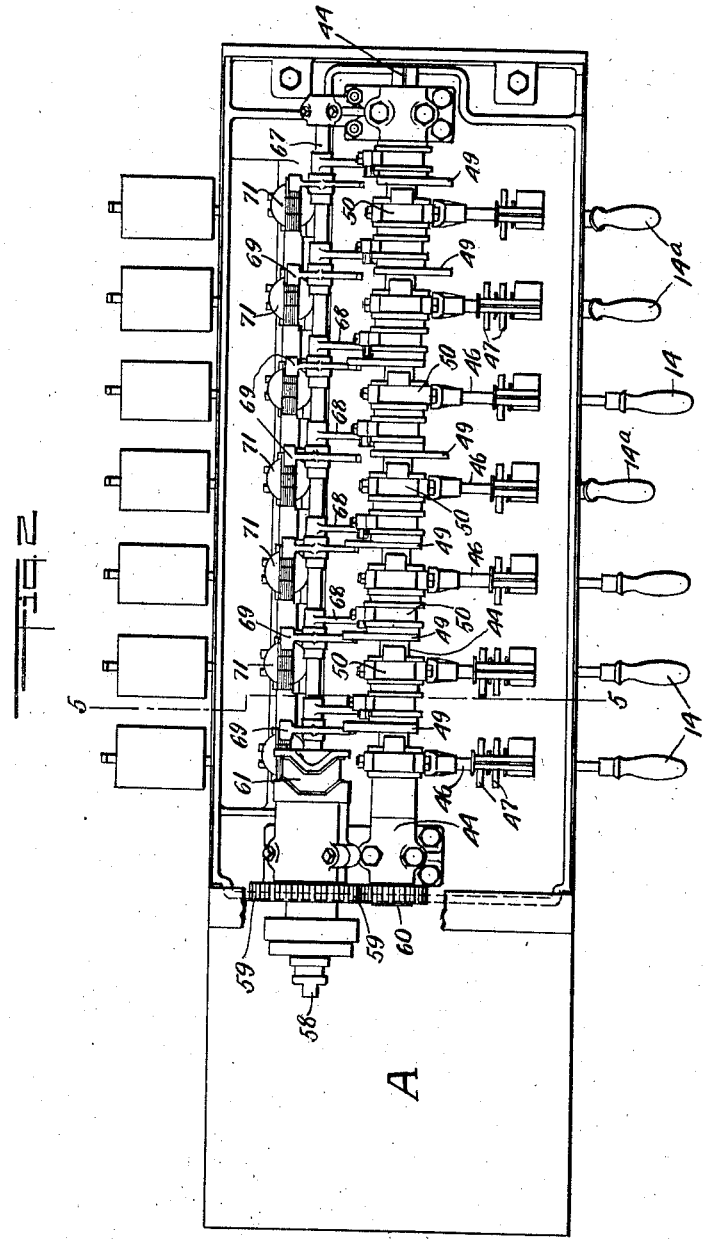

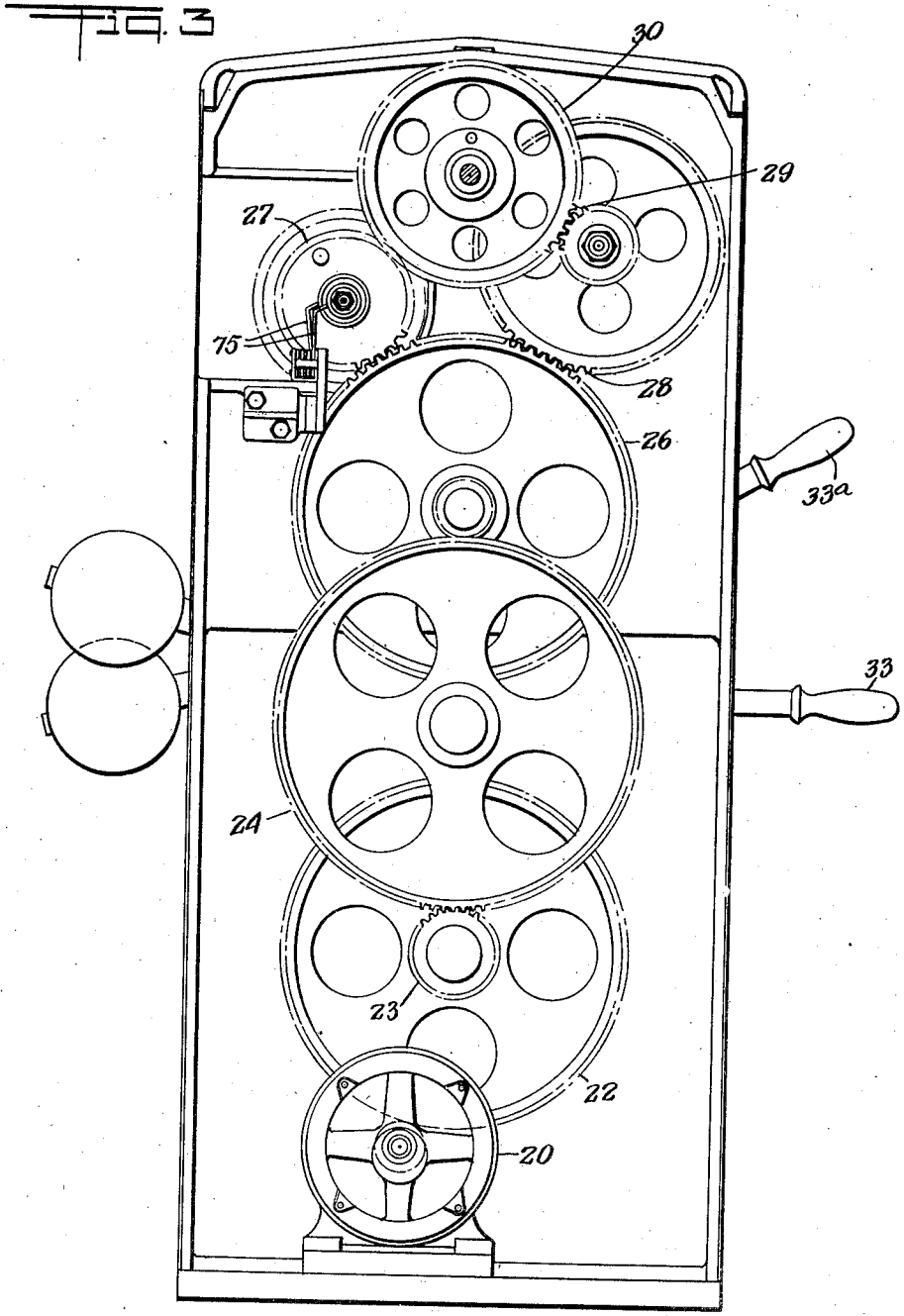

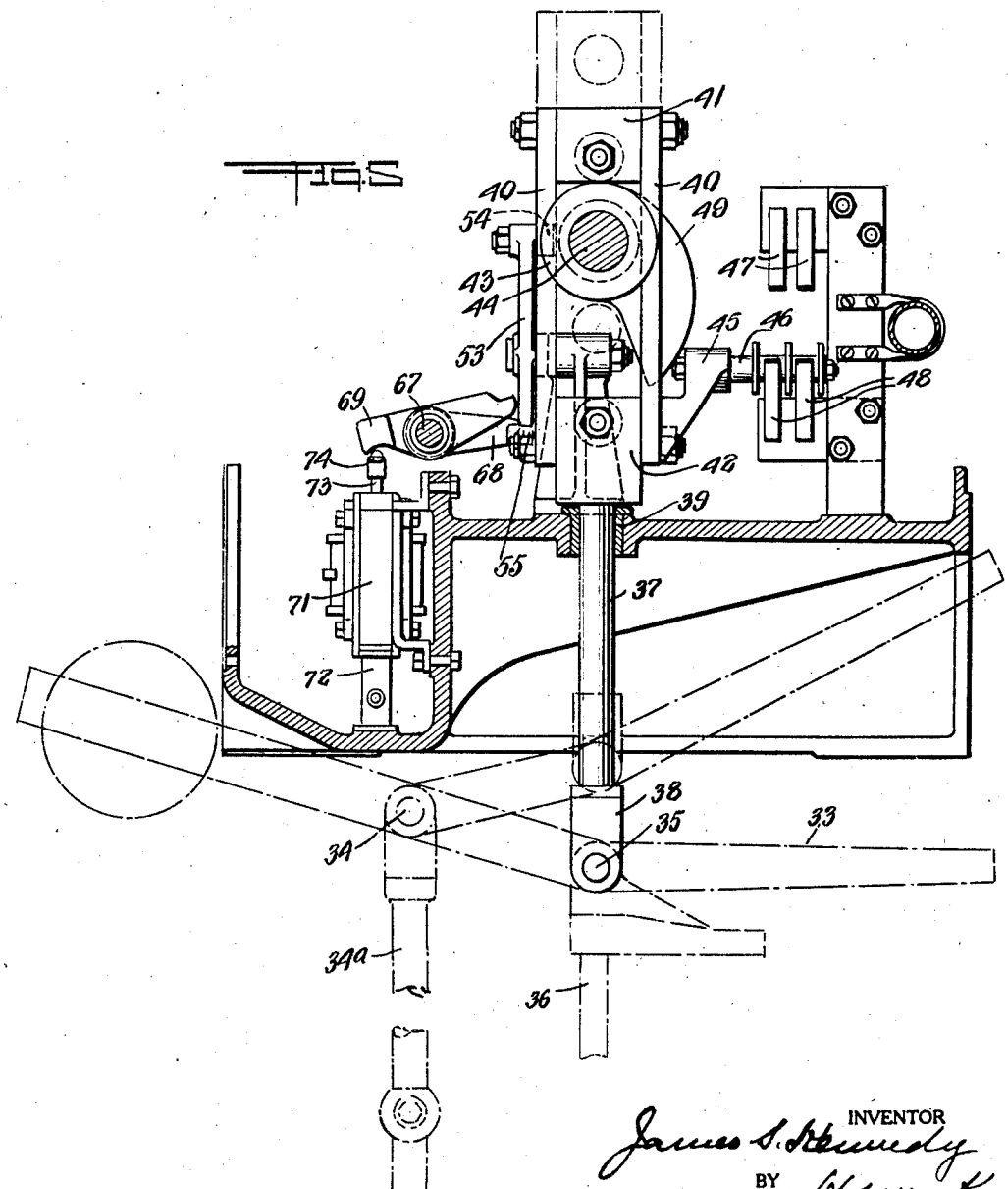

May 1, 1928.  
J. S. KENNEDY  
1,668,319  
AUTOMATIC CONTROLLER FOR GAS MAKING APPARATUS  
Filed Oct. 30. 1924   11 Sheets-Sheet 6
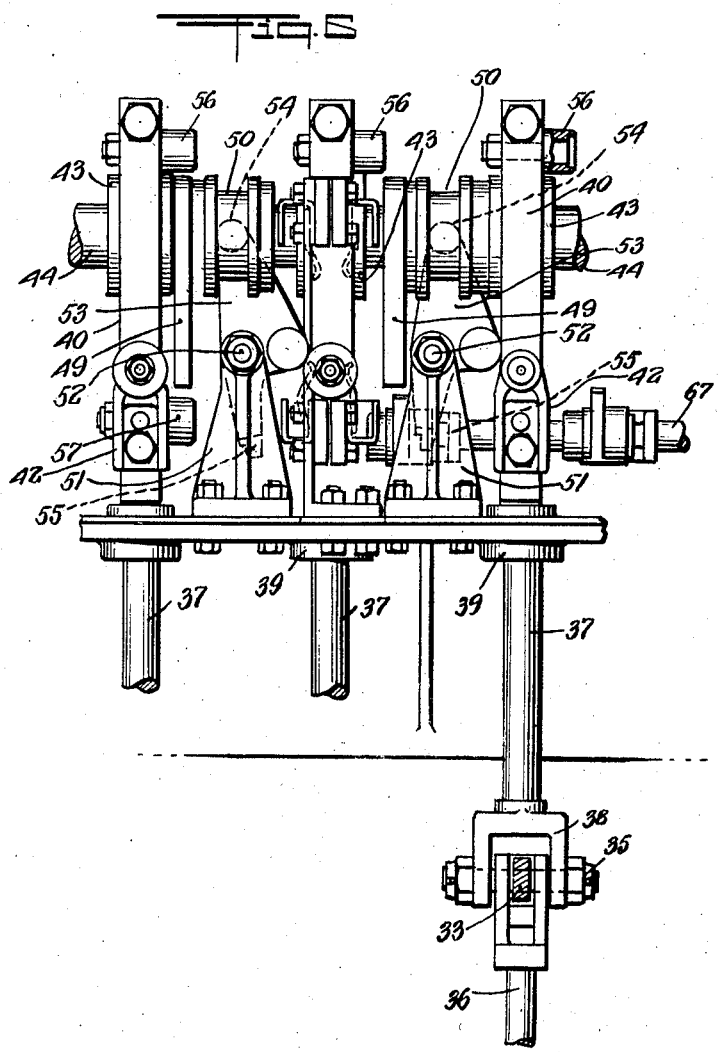
INVENTOR  
James S. Kennedy  
BY  
ATTORNEY

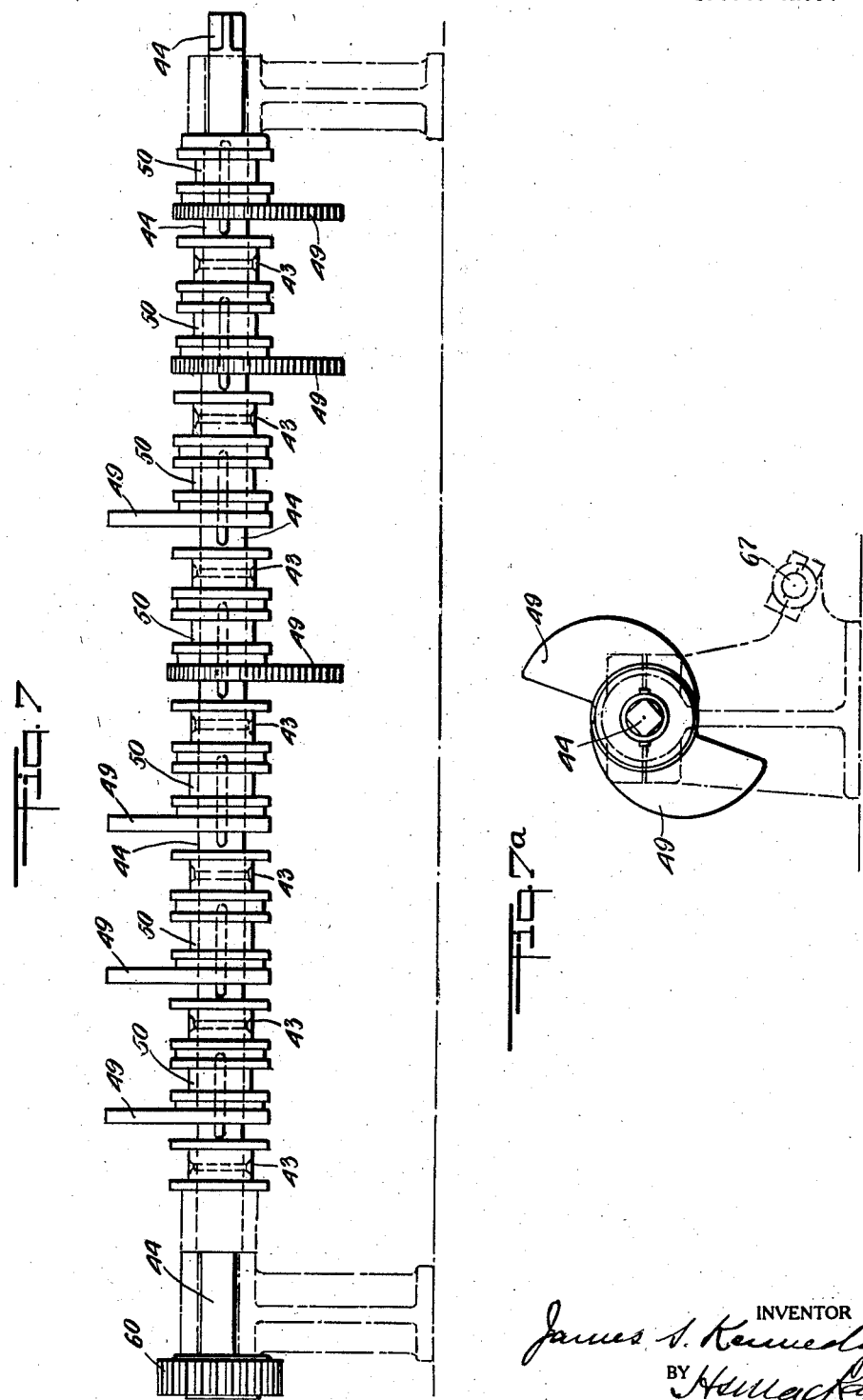

May 1, 1928.
J. S. KENNEDY
1,668,319
AUTOMATIC CONTROLLER FOR GAS MAKING APPARATUS
Filed Oct. 30, 1924     11 Sheets-Sheet 8
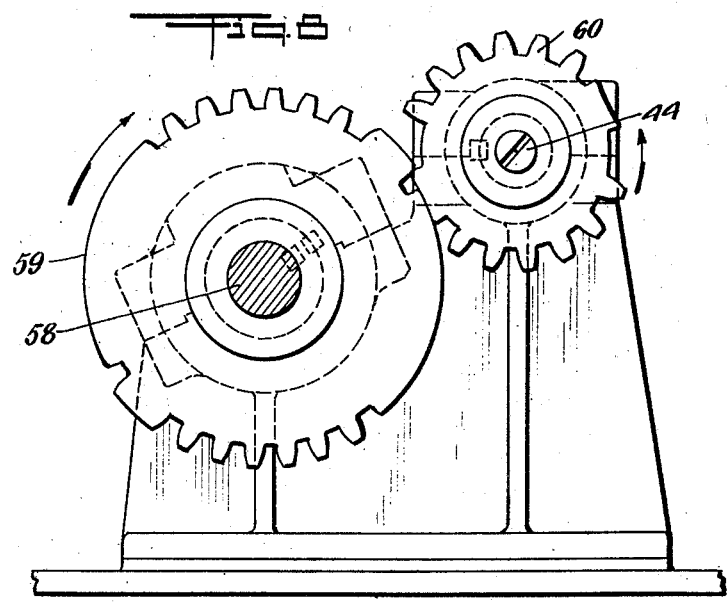
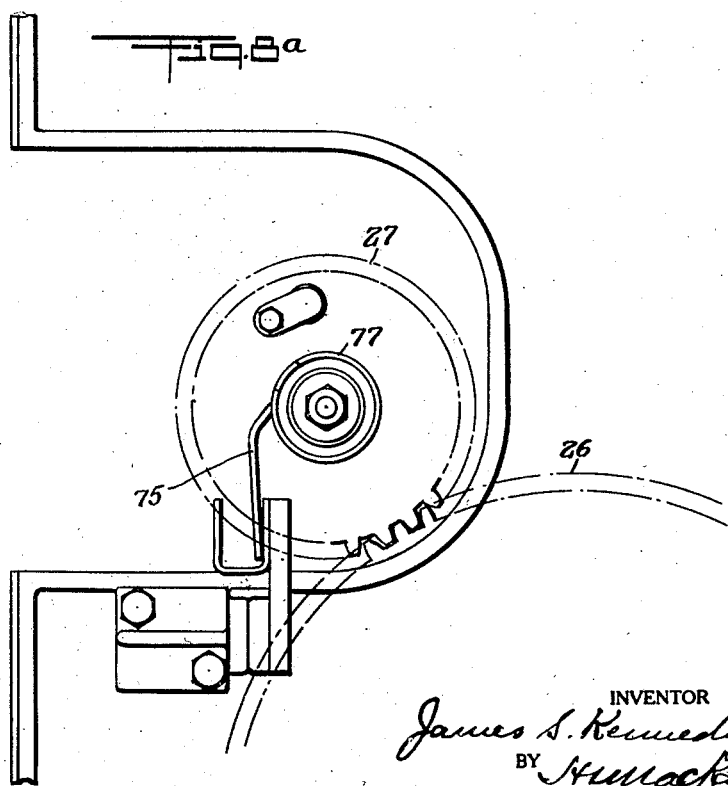
INVENTOR
James S. Kennedy
BY Hurlock
ATTORNEY May 1, 1928.  1,668,319
J. S. KENNEDY
AUTOMATIC CONTROLLER FOR GAS MAKING APPARATUS
Filed Oct. 30, 1924    11 Sheets-Sheet 9
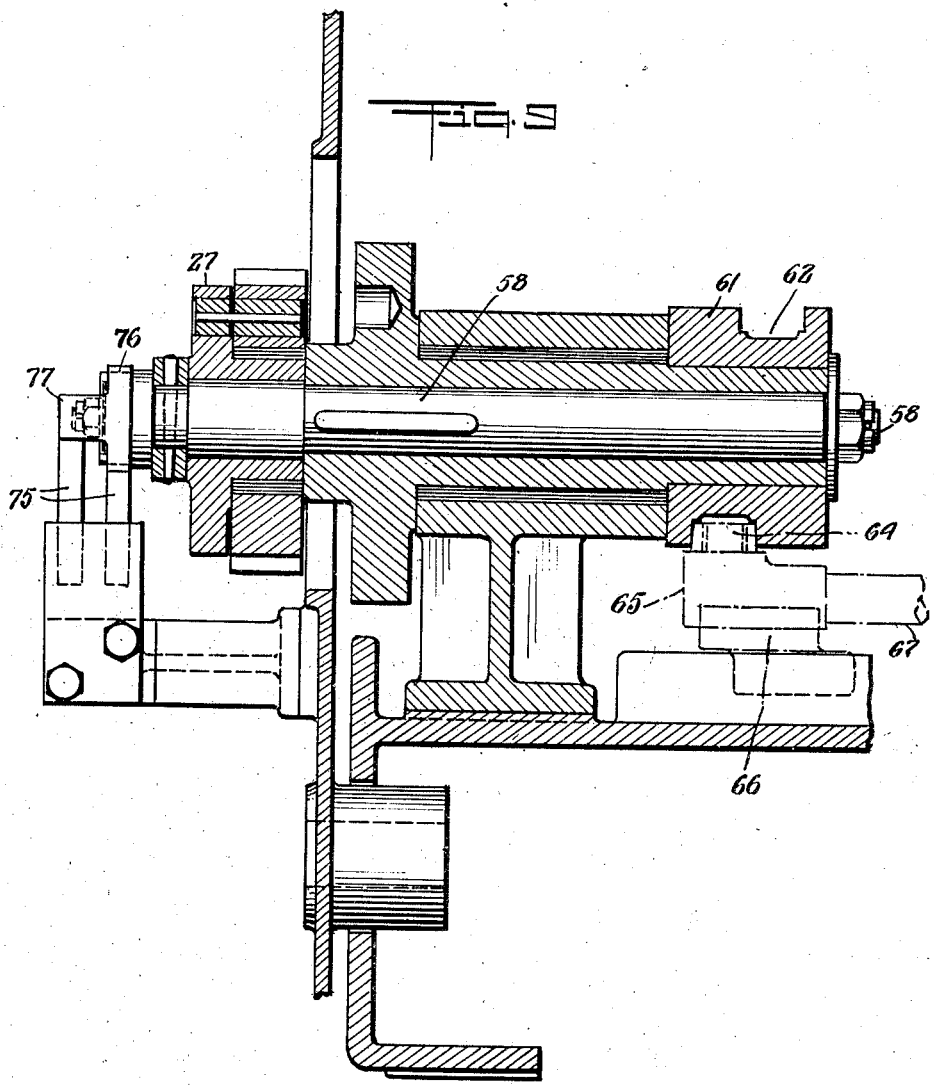

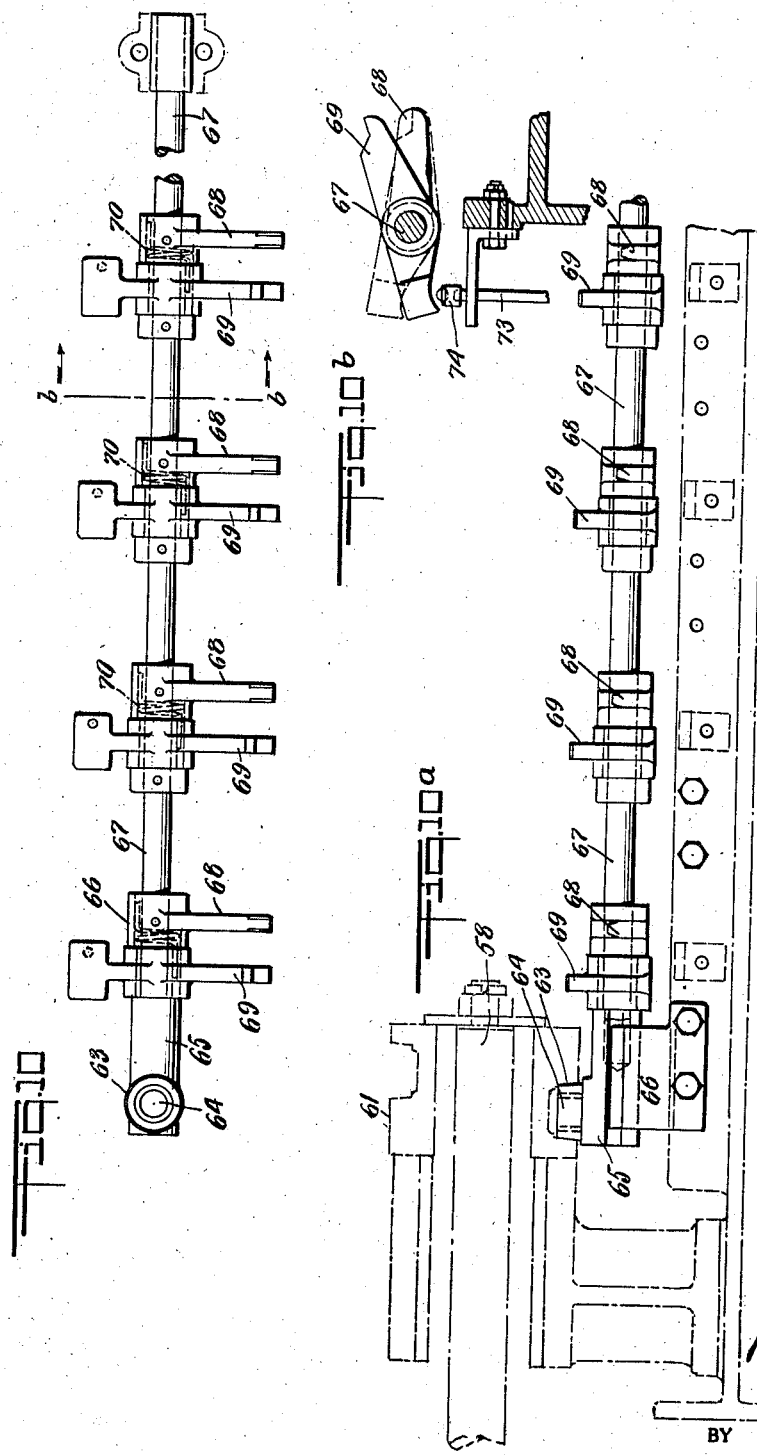

May 1, 1928.
J. S. KENNEDY
1,668,319
AUTOMATIC CONTROLLER FOR GAS MAKING APPARATUS
Filed Oct. 30, 1924    11 Sheets-Sheet 11
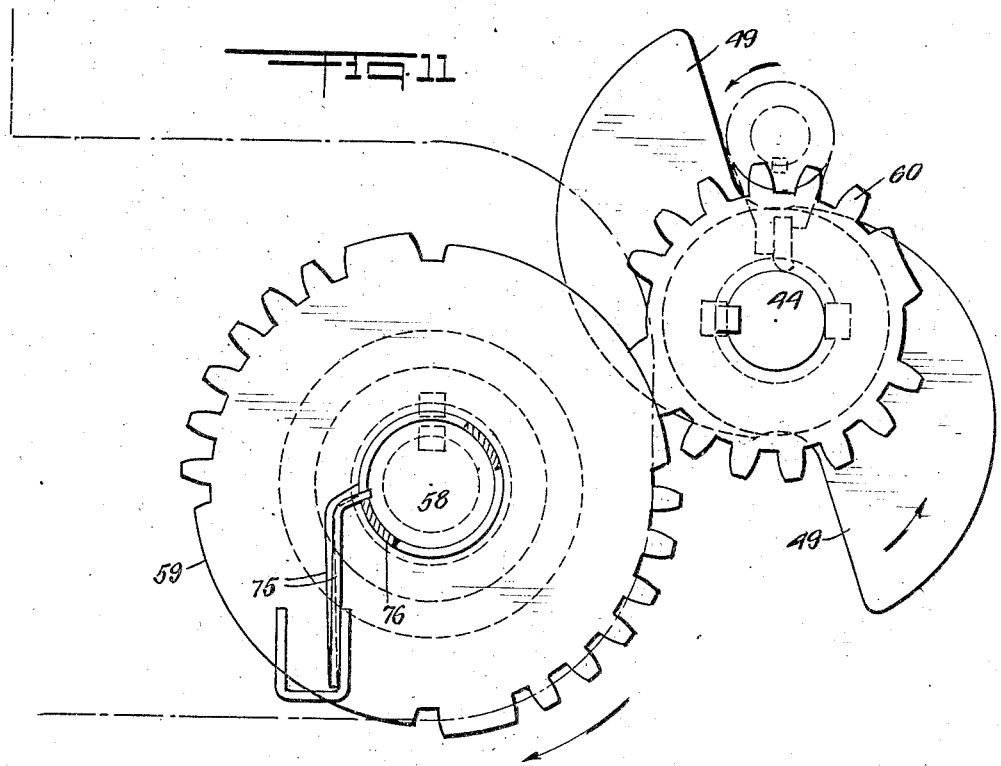
INVENTOR
James S. Kennedy
BY
ATTORNEY Patented May 1, 1928.

1,668,319

UNITED STATES PATENT OFFICE.

JAMES S. KENNEDY, OF PELHAM MANOR, NEW YORK, ASSIGNOR TO THE BARTLETT HAYWARD COMPANY, A CORPORATION OF MARYLAND.

AUTOMATIC CONTROLLER FOR GAS-MAKING APPARATUS.

Application filed October 30, 1924. Serial No. 746,739.

The present invention relates to an improved mechanism for the automatic operation of gas making apparatus, and especially for such as governs the operation of the valves employed in the control of water gas sets.

It is customary to actuate the main controlling valves of water gas sets by hydraulic power, the application of which is governed by means of master valves, there being one master valve for each main valve. These master valves have hitherto been generally operated by hand.

In a prior pending application filed by me in the U. S. Patent Office, February 15th, 1923, Serial No. 619,258, I have described and claimed an apparatus whereby the master valves aforesaid may be automatically operated while retaining the possibility of manual control of each and every valve at any time.

In another pending application for U. S Letters Patent filed August 15th, 1924, Serial No. 732,189, I have described and claimed an automatic interlocked electric controlling system for gas making machinery in which the valve controlling apparatus set forth in said prior application Number 619,258 is capable of acting as a unit.

The present invention relates to an improved form of apparatus adapted to carry out the functions of the automatic valve controller of said application Number 619,258, and equally well adapted to forming a unit in the general system set forth in said application Number 732,189. The present apparatus possesses a number of advantages over the earlier valve controller of said application Number 619,258, and principally that of being adapted to form a unitary mechanical whole with the central circuit controller of said later application Number 732,189 being mechanically connected up therewith and driven by the same motor, preferably electric.

The present apparatus is also capable of use in connection with the automatic system set forth in my United States Letters Patent, No. 1,498,174, dated June 17, 1924.

The principal additional advantages of the present apparatus over that of my earlier application No. 619,258 are found in the fact that in the present apparatus the valve hand levers are operated directly by a continuously operated motor, (preferably electric) whereas, in my earlier form, the power employed is hydraulic, although the ultimate control is electrical. By virtue of this change the number of parts is reduced and the simplicity of construction is greatly enhanced.

The invention is illustrated in a preferred form in the accompanying drawings, wherein Figure 1 is a partial view of the valve controller in front elevation, a portion of the front being removed, together with enough of the central circuit control mechanism of my application No. 732,189 to make clear the mode of connection of my present apparatus therewith.

Figure 2 is a plan view of the same, the space occupied by the central circuit controller being left blank at A.

Figure 3 is a view in side elevation of what is shown in plan in Figure 2 as seen from the left.

Figure 4 is a view similar to Figure 3 but viewed from the right in Figure 1, with certain parts removed.

Figure 5 is a partial transverse sectional view approximately on the line 5—5 in Figure 2.

Figure 6 is a view in front elevation of a part of the cam-shifting system.

Figure 7 is a plan view of the cam shaft and cams and Figure 7$^a$ is an end view of what is shown in Figure 7 as seen from the right.

Figure 8 is a view on an enlarged scale of the intermittent motion transmission gearing, and Figure 8$^a$ shows the relation of the regulating switch to the actuating gearing.

Figure 9 is a vertical sectional view of the preferred arrangement of gearing for actuating the cam that operates the reciprocating cam shifting shaft.

Figure 10 is plan view of the cam shifting shaft, Figure 10$^a$ is a front elevation of the same, and Figure 10$^b$ is a sectional view on the line $b$—$b$ of Figure 10.

Figure 11 is an end view on an enlarged scale showing the relation of the regulating switch to the intermittent transmitting gears and operating cams.

The present invention is adapted to be used in any form of gas making apparatus in which a group of valves or equivalent direct controlling means is employed to regulate the various operations involved. Inasmuch as the invention is especially useful in connection with water gas sets, however, and has been put to practical use for that purpose, I shall describe it hereinafter in the preferred specific form which I have produced for water gas sets, and more particularly in the complete form in which the central controlling apparatus of my aforesaid application Number 732,189 is combined in a unitary structure with the novel valve controller whose characteristics form the principal subject matter of my claims herein.

The electric motor which preferably supplies the power for running all the elements of the unitary device is shown at 20 in Figures 1 and 3. This motor drives the principal operating shafts both in the central main controller and in the automatic master valve operator; being geared down for this purpose in any appropriate manner. In the specific form shown this is accomplished as follows—(see Figures 1 and 3).

A pinion 21 on the motor shaft drives a spur gear 22, mounted upon the same shaft with a spur pinion 23. In a similar manner this pinion 23 drives the gear 24 and pinion 25 which in turn drive the spur gear 26. This gear drives the two gears 27 and 28.

The pinion 29 on the same rotating shaft with gear 28 drives the gear 30, and this in turn drives the quarter minute shaft 31 of the central circuit controller, through a clutch 32. (See Figure 1.) This shaft 31 corresponds to the shaft 1 described in my said application Number 732,189, and in Figure 1 of the present drawings I have shown enough of the construction of the parts immediately associated with this shaft to indicate clearly the relation between the driving gears 21 to 30 and the complete central circit controller set forth in full in said application. It is to be understood that the complete structure in question occupies the blank space A at the left of Figures 1 and 2. The details are fully described in said application Number 732,189, and need no description here, as they are not herein specifically claimed. It will, of course, be understood that the ratios of the various gears are such that, when the motor 20 is running continuously at its constant rated speed, the shaft 31 and clutch 32 make one revolution per quarter minute.

The hand levers by means of which the several master valves of the system or their equivalents may be operated by hand are shown in the lower (valve-closed) positions at 33 in Figures 1, 2, 3 and 4; and in the upper (valve-open) positions at 33ª. Referring to Figures 5 and 6, it will be seen that these levers are fulcrumed at 34 on a swinging lever 34ª, and are pivotally connected at 35 to the vertically reciprocating master valve rods 36. The control valves and main valves are not illustrated, as they are identical with those already well known in this art. The expression levers as used in my claims is intended to cover as well any equivalent valve actuating mechanism.

The automatic operation of the various master valve rods 36 is accomplished by vertical movements of the actuating rods 37 forming a part of the valve motivators. These are pivotally attached to the respective hand levers by means of clevises 38 (see Figures 5 and 6). These actuating rods are guided for vertical reciprocation by the guide bushings 39.

Each actuating rod 37 is rigidly connected to the bottom of a rectangular thrust frame, each frame comprising two vertical side members 40, united by an upper cross piece 41 and a lower cross piece 42, to which latter the actuating rod 37 is fixed.

Each of the thrust frames just described embraces, and moves vertically upon, a flanged spool 4, whose flanges in turn embrace the side pieces 40 (see Figures 5 and 6). These spools are pinned in fixed positions upon the cam-carrying shaft 44.

At the lower end of each thrust frame above described there is fixed an extension piece 45, carrying an insulated movable switch member 46 (see Figure 5). As each thrust frame moves up or down as hereinafter described, this movable switch member makes contact either with the fixed switch fingers 47 or with 48, as the case may be. The switches thus constituted are the "pilot valve interlock switches" referred to and completely described in my aforesaid pending patent application Number 732,189. Their electrical relation to the system therefore needs no description here.

Upon the shaft 44, which is driven intermittently in a manner described hereinafter, there are carried cams 49; there being one cam for each thrust frame and master valve operator. Each cam 49 is fixed to the side of a flanged spool 50, slidably keyed upon the shaft 44, and always rotating with said shaft.

Referring still principally to Figures 5 and 6, it will be seen that, on one side of each thrust frame, the main frame supports an upright bracket 51 upon which is fixed a stud shaft 52. A cam shifting plate 53 is pivotally mounted upon each stud shaft 52. Each cam shifting plate or member 53 has a pin 54 at its top which engages the flanges of the spool 50, for shifting the same on the shaft 44, and at the bottom of each plate is a tail piece 55 to receive the thrust of the shifting fingers as hereinafter described.

The upper cross piece of each thrust frame carries a cam roller 56 and the lower cross piece carries a similar cam roller 57.

If the upper end of any cam shifting plate 53 with its pin 54 be thrown to the left in Figure 6, the corresponding spool 50 with its attached cam 49 will be slid to the left on the shaft 44, so as to bring such cam into engagement position with either of the rollers 56 or 57. At the left of Figure 6 the cam is shown ready to act upon the upper roller 56, when the shaft 44 and cam 49 rotate counterclockwise in Figure 5. This will lift the frame 40 and with it the rod 37 and lever 33. Of course, if the cam be shifted so as to act on the lower roller 57 it will push down the rod 37 and lever 33.

The intermittent movement of the shaft 44 is accomplished by the following means, reference being had particularly to Figures 1, 2, 3, 8 and 11.

The gear 27, driven by the gear 26, is keyed to the same shaft 58 as the intermittent driving gear 59. This last named gear drives intermittently the gear 60 which is keyed to the cam driving shaft 44. Figures 8 and 11 show these gears in detail and it will be seen that they constitute a well known form of intermittent transmission gearing requiring no further description here. As arranged in Figures 8 and 11, the proportions of geared and smooth portions of the two gears are such that the driven gear 60 and shaft 44 are rotated 180 degrees at a time at regular intervals; the time interval between movements (during which the shaft 44 is at rest) being equal to the time occupied in making each 180 degree movement.

During the rest periods of the shaft 44, each cam 49 occupies either the angular position shown in Figure 5, or that at 180 degrees therefrom. In either case the cam, as shown in Figure 5 is so related to the vertical positions of the corresponding rollers 56 and 57, that, if the cam be shifted into engaging position, as heretofore described, only the shortest radii of the cam periphery can engage one of said rollers.

The mechanism for selectively actuating the cam shifting members 53 to bring the cams one at a time into operative position will now be described.

Referring to Figure 9, the shaft, which carries the gear 59, also has keyed to it the spirally grooved gutter cam 61, the spiral groove 62 of which is entered by the horizontal cam-roller 63 on the stud 64 carried by the member 65 (see Figures 10 and 10ᵃ). This last named member slides horizontally in a fixed guide bearing 66 and is pinned to one end of the reciprocating shaft 67.

It is obvious that, as the shaft 58 revolves continuously, the spiral groove in the cam 61 will act upon the roller 63 to move the shaft 67 back and forth longitudinally in its bearings. The groove is so shaped that it moves the shaft 67 intermittently, there being one forward and one backward movement of said shaft for each 180 degree motion of the shafts 58 and 44. Moreover the angular position of the cam 61 on its shaft is carefully calculated to properly time the intermittent reciprocations of the shaft 67 with relation to the rest and motion periods of the shaft 44, as hereinafter explained.

Properly spaced along the shaft 67 are mounted pairs of shifting fingers 68 and 69, each pair corresponding to one of the cam-shifting members 53. One finger 68 of each pair is fixed on the shaft and is employed to make its cam-shifting member 53 withdraw the corresponding cam 49 from operative position between the rollers 56 and 57. The other finger 69 of each pair is used to have the opposite effect, bringing its corresponding cam 49 into operative position.

This latter finger 69 of each pair is free to swing through a limited arc on the shaft 67, but is confined so that it cannot move longitudinally of the shaft. Within the hubs of these fingers are arranged spiral springs 70, so connected as to tend to hold all the fingers 69 tilted up in the normal position shown in Figures 5, 10ᵃ and 10ᵇ. In this position the ends of the fingers are out of line with the heretofore described tail pieces 55 on the shifting plates 53 (see Figures 4, 5 and 6).

It will be seen that, as the shaft 67 reciprocates, carrying with it the pairs of fingers 68, 69, whenever any swinging finger 69 is tilted against the action of its spring 70, to bring its end into line with the corresponding tail piece 55, the pressure of said finger moving toward the right in Figure 10, will shift the corresponding cam 49 into operative position. The next or return movement of the shaft 67 will cause the other finger 68 to push the tail piece 55 in the opposite direction, thus removing the corresponding cam 49 from operative position between the rollers 56 and 57. The selective tilting of one or another finger 69 to throw the right cam 49 at the right time may be carried out in a variety of ways, but I prefer to accomplish this by electro-magnetic means capable of proper operation by the central controller of my said application Serial Number 732,189.

For this purpose there are employed solenoids 71, (Figures 4 and 5) in a row parallel to the shaft 67, one solenoid for each pair of fingers and each shiftable cam. These are the solenoids referred to in said application No. 732,189, and shown at R, M, P, K, J, N and H in Figure 14 thereof.

The plunger 72 of each solenoid carries a stiff rod 73 bent upward alongside of the solenoid, extending above it, and terminating in a tip 74 which engages under the left end of each finger 69 (see Figures 4 and 5).

The insulated spring contact fingers 75 (Fig. 9) are adapted to bear respectively upon the continuous part 76 and the discontinuous part 77 of an insulated metal ring carried by the revolving shaft 58. These elements constitute a switch which is so arranged as to interrupt the circuit through the common return wire of all the solenoids 71 at definite times with relation to the rotation of the shafts 58 and 44.

These various parts are so proportioned and arranged that the solenoids 71 can only be energized during the time periods when the cam shaft 44 is at rest. The rotary switch just described is shown in its electrical relation to the whole system at the right hand side of Figure 14 of my application No. 732,189, where it is connected with wires 251 and $L^2$.

Assuming, now, that all the cams are out of operative position, as shown at the right in Figure 6, and assuming also that, during a period of rest of the shaft 44, one of the solenoids is energized, the plunger 72 is lifted at once. The rod 73 thus lifts the left end (Figure 5) of the finger 69, bringing the opposite end into line with the corresponding tail piece 55.

At this moment the shaft 67 is moving toward the right in Figure 10 and the finger 69 will push its tail piece 55, so as to bring the corresponding cam into operative position where it is free to engage whichever roller 56 or 57 is in front of its operative surface when it next moves.

This being accomplished, the shaft 44 moves 180 degrees counter clockwise in Figure 5 and, as shown in that figure, the cam 49 will lift the frame 40 and the rod 37 and lever 33. The lifting of the frame 40 breaks the circuit of the corresponding solenoid at the switch 46, 48. The solenoid plunger 72 and rod 73 are thus allowed to drop, and the corresponding finger 69 is thus free to tilt up into the position shown in Figures 4, 5 and $10^a$, under the influence of its spring 70. Thereupon the shaft 67 moves toward the left in Figures 10 and $10^a$, the fixed finger 68 strikes the tail piece 55 of the shifting plate 53, and the cam 49 is withdrawn into the inoperative position illustrated at the right in Figure 6.

In the operation just explained the frame 40 was assumed to be in its lower position when the corresponding cam 49 was shifted; but this shifting sometimes occurs when the frame is in its raised position. In this case the cam would make an idle motion of 180 degrees, when the solenoid circuit would be broken at the rotary switch 75, 77, the reciprocating shaft 67 moves to the left and the cam is returned to inoperative position. Before the next 180 degree movement of the shaft 44, however, the solenoid circuit is again closed at the switch 75, causing the cam 49 to take the operative position, so that, when the next movement of the shaft 44 causes it to bear on the lower roller 57, it depresses the frame 40 and closes the master valve.

Idle movements such as have just been described are apt to take place occasionally, because the energizing of any particular solenoid may not occur at the moment when the corresponding cam is in proper angular position to become at once operative upon one of the rollers 56 or 57. These actions take place so quickly, however, that there is no appreciable loss of time.

As shown in Figures 1, 2, 7, $7^a$ and 11, some of the cams 49 have different 180 degree positions around the shaft 44 from others. These are so arranged in assembling the apparatus as to produce a minimum of idle movements, taking into account the frequency of movement and the necessary sequence of operation of the various valves operated by the respective cams. Of course two or more cams may be simultaneously thrown into operative position by simultaneously energizing the corresponding solenoids.

From the above description, and particularly by inspection of Figure 5, it will be seen that any pilot valve lever 33 may be hand operated at any time, save while automatic operation of the particular valve in question is in progress.

The various electrical circuits and switches controlled by the central controller at A to determine the appropriate selection and operation of the individual valve operating units above described will be understood in connection with Figure 14 of my aforesaid pending patent application Serial No. 732,189.

While I have herein referred to my improved apparatus as adapted to control and operate the main valves of a water gas set through the usual master valves, it will be clear that the means herein described might be applied to the motivation of any appropriate devices adapted to the control of the main operating elements of a gas making apparatus, whatever the nature of those operating elements might be, and whatever the nature of their immediate controllers, whether they be master valves or other mechanisms.

Many changes may be made in the arrangement, form and organization of this apparatus without departing from the scope of my invention, which is not limited to the details herein shown and described, save as specifically set forth in the following claims:

What I claim is—

1. Means for automatically operating a group of controller levers in a desired sequence comprising a group of motivators for said levers, mechanism for determining the respective operations of said motivators, electro-magnetic devices for governing the operation of said determining mechanism, a central mechanism for selectively operating said electro-magnetic devices, and a common motor for actuating both the central mechanism and said determining mechanism.

2. Apparatus as in claim 1 wherein the common motor is also adapted to actuate the group of motivators.

3. Means for automatically operating a group of controller levers in a desired sequence comprising a group of motivators for said levers, mechanism for determining the respective operations of said motivators and a common motor for actuating both said motivators and said determining mechanism.

4. Apparatus as in claim 3, in combination with electro-magnetic means for governing the operation of said determining mechanism.

5. Means for automatically operating a group of controller levers in a desired sequence comprising reciprocating frames, a shiftable and revoluble cam for each frame, and means for moving each cam into and out of operative relation with its respective frame.

6. In apparatus as in claim 5, a motor for rotating the cams, and mechanism actuated by said motor for operating the means for shifting the cams.

7. In apparatus as in claim 5 motive means for intermittently rotating the cams, motive means for intermittently actuating the cam-shifting means, and means for controlling the periods of operation of said two sets of motive means to prevent interference of one with the other.

8. In apparatus as in claim 5, motive means for intermittently rotating the cams, electro-magnetic devices for determining operation of the cam shifting means, and a switch operated by said motive means and in circuit with the electro-magnetic devices, adapted to prevent cam shifting during cam rotation.

9. In apparatus as in claim 5, an actuating device for operating each cam shifter adapted to be moved into and out of operative relation with said cam shifter, means for imparting a cam-shifting motion to said devices at regular intervals of time, and a separate selective means for each actuating device adapted to move it into operating position with relation to its corresponding cam shifter.

10. In apparatus as in claim 5, a cam shifter comprising a reciprocating carrier, movable shifting fingers carried thereon, means for imparting a reciprocating movement to said carrier, and a separate selective device for moving each finger on the carrier.

11. In apparatus as in claim 5, a cam shifter comprising a reciprocating carrier, movable shifting fingers carried thereon, means for imparting a reciprocating movement to said carrier, a solenoid for each finger, and means operated by each solenoid for moving the corresponding finger.

12. In apparatus as in claim 5, a cam shifter comprising a reciprocating carrier, means for actuating the same and a number of pairs of cam-shifting fingers on the carrier, one finger of each pair being fixed on the carrier and the other having a limited swinging movement thereon.

In testimony whereof I have hereto set my hand on this 22nd day of October, 1924.

JAS. S. KENNEDY.